(12) United States Patent
Shepherd et al.

(10) Patent No.: US 8,506,463 B2
(45) Date of Patent: Aug. 13, 2013

(54) ROLLER ASSEMBLY

(75) Inventors: Nigel R C Shepherd, Ross-on-Wye (GB); Gary P. Deaville, Ross-on-Wye (GB)

(73) Assignee: The Haigh Engineering Company Limited (GB)

( * ) Notice: Subject to any disclaimer, the term of this patent is extended or adjusted under 35 U.S.C. 154(b) by 958 days.

(21) Appl. No.: 12/554,311

(22) Filed: Sep. 4, 2009

(65) Prior Publication Data

US 2010/0062920 A1 Mar. 11, 2010

(30) Foreign Application Priority Data

Sep. 9, 2008 (GB) .................................. 0816463.4

(51) Int. Cl.
*F16C 13/00* (2006.01)
(52) U.S. Cl.
USPC .................... 492/49; 492/38; 492/39; 492/40
(58) Field of Classification Search
USPC ................ 492/49, 38, 39, 40; 29/895, 895.2, 29/895.21, 895.211, 895.212, 895.213, 895.22, 29/895.23; 57/408, 409, 410, 412; 19/97, 19/98, 105, 112, 219, 266
See application file for complete search history.

(56) References Cited

U.S. PATENT DOCUMENTS

| 4,715,177 A | 12/1987 | Stahlecker | |
|---|---|---|---|
| 7,481,756 B2 * | 1/2009 | Derscheid et al. | 492/47 |
| 2005/0176538 A1 * | 8/2005 | Morita | 474/136 |

FOREIGN PATENT DOCUMENTS

GB 1168213 10/1969

OTHER PUBLICATIONS

The GB communication dated Jan. 5, 2010 in a corresponding foreign application.

* cited by examiner

*Primary Examiner* — Sarang Afzali
(74) *Attorney, Agent, or Firm* — Nields, Lemack & Frame, LLC

(57) ABSTRACT

A roller assembly (40) including a roller (46) fixed to a flange bearing (48) which is engaged with a roller sleeve (50) and rotatable relative to it, the roller (46), the flange bearing (48) and the roller sleeve (50) all being retained on a mounting screw (51) between a nut (58) threaded onto the screw (51) and a washer (52) mounted on the nut (51).

2 Claims, 2 Drawing Sheets

ROLLER ASSEMBLY

This invention relates to a roller assembly having particular, but not exclusive, use in a bandscreen. A bandscreen is used for screening particulate matter from a flow of wastewater which includes a number of screening panels joined together to form an endless belt.

In one known arrangement the screening panels are coupled together by articulating links disposed between, and across the width of, adjacent screening panels. Stub shafts are welded to the outer ends of the articulating links. Chain links are placed over the stub shaft to link together adjacent articulating links which chain links collectively form a pair of chains, one at each side of the interlinked screening panels. The ends of each of the stub shafts also support roller assemblies having rollers of which lie within a guide channel.

The bandscreen is rotated by driving the chains which are guided by the rollers in the guide channels.

Referring to FIG. 1, there is shown an exemplary prior art arrangement of a roller assembly 10 mounted on a stub shaft 12 which in turn is welded to the end of an articulating link 14 of a bandscreen. The roller assembly 10 includes a plastics roller 16 fixed to a flange bearing 18 with U-shaped outer cross-section which is rotatably mounted on the stub shaft 12 and retained on it by a screw 20 which holds a washer 22 in position against the end of the stub shaft 12 which in turn overlaps the outer end of the bearing 18. A radially outward step 24 of the stub shaft 12 provides a limited longitudinal freedom of movement to the roller 16 between it and the washer 22

A C-washer 26 is clipped onto the stub shaft 12 which limits the movement of a side plate 29 on the stub shaft 12 and is covered by a cup-washer 28.

This arrangement of roller assembly 10 has a number of disadvantages. The bearing 18 will wear along with the part of the stub shaft 12 on which it is mounted. It is therefore necessary to periodically replace the stub shaft 12 by removing it from the articulating link 14 and welding a new one in place. This requires at least partial disassembly of the bandscreen. Once the screw 20 is removed there are several loose elements which in the difficult environment of bandscreen undergoing disassembly can be easily dropped.

The present invention, which is as claimed in the claims, seeks to provide a roller assembly which doesn't have these disadvantages.

An embodiment of the present invention will now be described, by way of example only, with reference to the accompanying drawings, of which:

Figure 1:
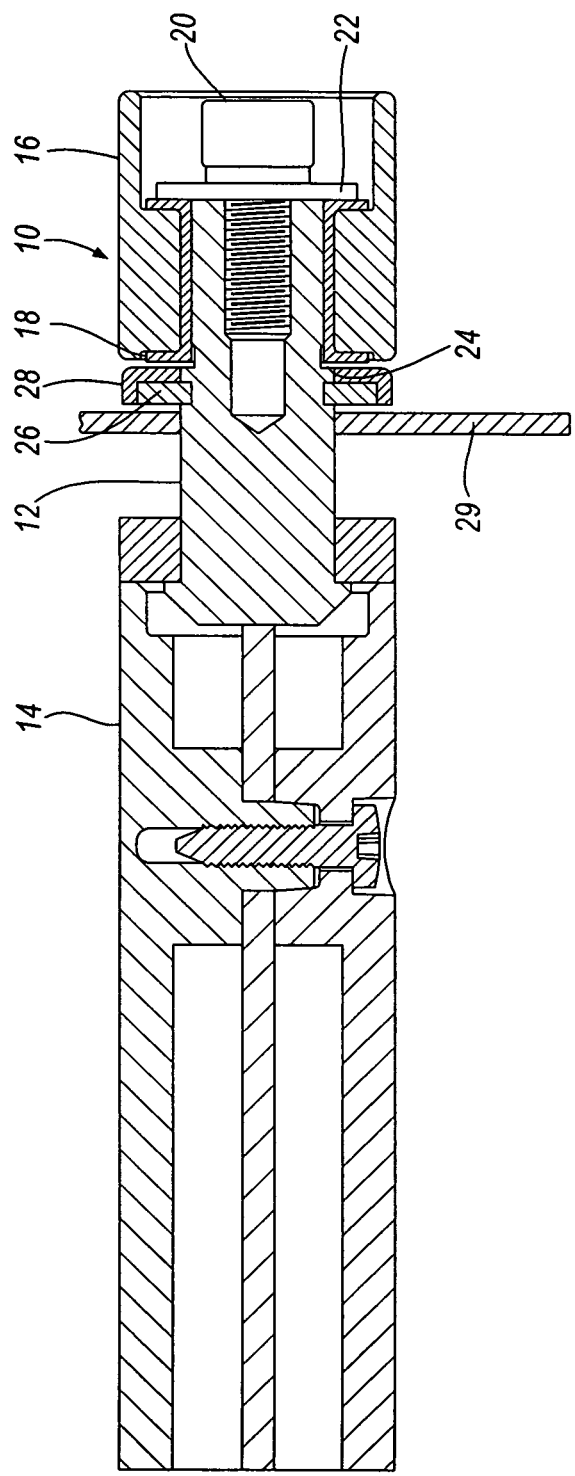
FIG. 1 is a cross-sectional side view of a prior art roller assembly.

The prior art roller assembly of FIG. 1 has already been described.

Figure 2:
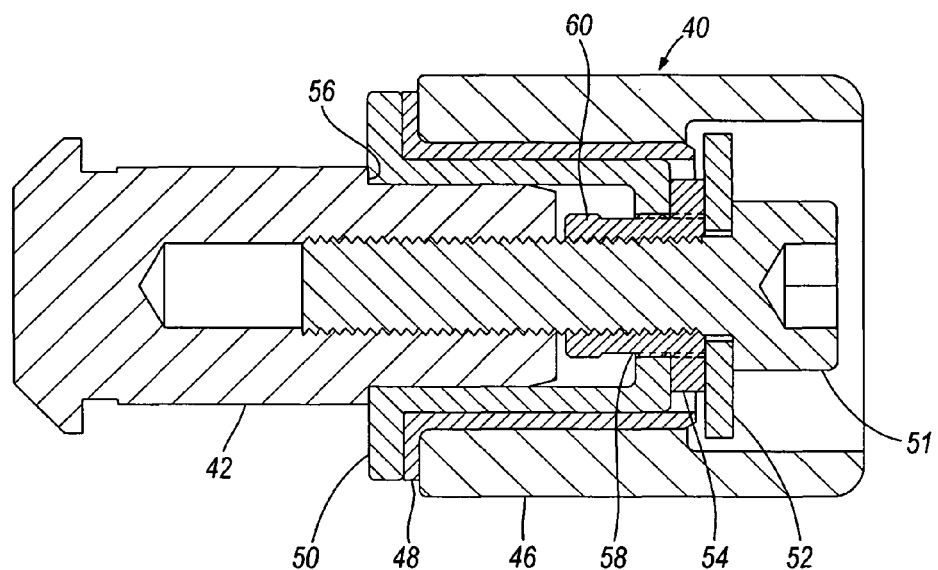
FIG. 2 is a cross-sectional side view of a roller assembly according to the present invention.

Referring now to FIG. 2 there is shown a roller assembly 40 mounted on a stub shaft 42 which is equivalent to the stub shaft 12 of FIG. 1. A plastics roller 46 is a pushfit on a flange bearing 48 which in turn is rotatably mounted on a roller sleeve 50 which in turn is a pushfit on the stub shaft 42 such that it remains rotationally fixed relative to it when the roller 46 rotates with the flange bearing 48.

A screw 51 has mounted on it a washer 52 and a spring washer 54, the spring washer abutting the roller sleeve 50 so that when the screw 51 is screwed into the end of the stub shaft 42 the roller sleeve 50 is pressed against a step 56 on the stub shaft 42 so holding it in position relative to the stub shaft 42.

A retaining nut 58 is threaded onto the screw 51 which passes through central holes in the roller sleeve 50 and spring washer 54 and which has an end portion 60 of larger diameter than the holes in the roller sleeve 50 and spring washer 54.

In use the roller 46 and flange bearing 48 rotate together relative to the roller bearing 50, the flange bearing 48 and the roller bearing 50 being the internal components that are subject to wear. When they need replacing the screw 51 is unscrewed from the stub shaft 42 with all the components of the roller assembly 40 being retained on the screw 51 as a single assembly between the washer 52 and end 60 of the nut 58. The roller sleeve 50 does not move relative to the stub shaft 42 and so the stub shaft 42 is not subject to wear so simplifying greatly maintenance of the equipment fitted with the roller assembly 40 of the present invention.

The invention claimed is:

1. An apparatus including:
a roller assembly comprising
a roller fixed to a flange bearing which is engaged with a roller sleeve and rotatable relative to it, said roller, said flange bearing and said roller sleeve all being retained on a mounting screw between a nut threaded onto said mounting screw and a washer mounted on said nut; and
a shaft having a radial outward step and an end; and in which said mounting screw is screwed into said end of said shaft; and
said roller sleeve is fixed relative to said shaft and pressed against said radial outward step of said shaft by said mounting screw.

2. The apparatus as claimed in claim 1, in which:
said mounting screw has a proximal end and a screw head at said proximal end of said mounting screw;
said nut threaded onto said mounting screw has a first portion distal said screw head and a second portion more proximal said screw head, said first portion having a larger diameter than said second portion;
said washer is mounted and retained towards said proximal end of said mounting screw by said nut;
said roller sleeve is mounted on said nut and has a radially outwardly extending flange;
said flange bearing is mounted on said roller sleeve so as to be rotatable relative to said roller sleeve; and such that when said roller assembly is detached from said shaft:
said roller sleeve is retained on said nut by said first portion of said nut; and
said roller and flange are retained on said roller sleeve by said radially outwardly extending flange of said roller sleeve and said washer.

* * * * *